(12) United States Patent
Gabrys (10) Patent No.: US 7,068,014 B2
(45) Date of Patent: Jun. 27, 2006

(54) ONLINE ALTERNATOR FLYWHEEL SYSTEM

(76) Inventor: Christopher W Gabrys, 1001 S. Meadows Pkwy., #1126, Reno, NV (US) 89521

( * ) Notice: Subject to any disclaimer, the term of this patent is extended or adjusted under 35 U.S.C. 154(b) by 193 days.

(21) Appl. No.: 10/617,202

(22) Filed: Jul. 9, 2003

(65) Prior Publication Data

US 2004/0012277 A1 Jan. 22, 2004

Related U.S. Application Data

(60) Provisional application No. 60/394,505, filed on Jul. 9, 2002.

(51) Int. Cl.
*H02K 7/02* (2006.01)
*H02J 3/33* (2006.01)

(52) U.S. Cl. ............................. 322/4; 307/68; 318/161
(58) Field of Classification Search .................. 322/4; 307/68; 318/161
See application file for complete search history.

(56) References Cited

U.S. PATENT DOCUMENTS

| | | | | | |
|---|---|---|---|---|---|
| 4,109,743 | A | * | 8/1978 | Brusaglino et al. | 180/65.4 |
| 4,218,624 | A | * | 8/1980 | Schiavone | 290/45 |
| 4,412,170 | A | | 10/1983 | Roesel, Jr. | 322/4 |
| 4,656,576 | A | * | 4/1987 | Kawarabayashi | 700/28 |
| 5,053,635 | A | | 10/1991 | West | 307/67 |
| 5,731,645 | A | * | 3/1998 | Clifton et al. | 310/74 |
| 5,905,321 | A | * | 5/1999 | Clifton et al. | 310/178 |
| 5,920,138 | A | * | 7/1999 | Clifton et al. | 310/90.5 |
| 5,931,249 | A | * | 8/1999 | Ellis et al. | 180/165 |
| 5,932,935 | A | | 8/1999 | Clifton et al. | 307/60 |

(Continued)

Primary Examiner—Darren Schuberg
Assistant Examiner—Pedro J. Cuevas
(74) Attorney, Agent, or Firm—J. Michael Neary (57) ABSTRACT

A flywheel energy storage system for preventing power interruptions to a load from interruptions of primary power includes a flywheel supported for rotation about an axis on a bearing system, and a motor-generator having a rotor coupled with the flywheel, and having a stator with multiple armature windings and a field coil. The field coil generates flux that passes through the armature windings as the rotor rotates to produce torque for accelerating the flywheel during charging, and produces electrical power from the flywheel during discharge. The armature windings are energized by a DC buss that is supplied by a rectifier connected to primary power. The flywheel system provides instantaneous full power capability along with output control for extracting more energy from the flywheel. The field coil is oversized and is powered in standby operation to produce an armature back emf that is at least 75% of the DC buss voltage. The current to the field coil remains substantially constant during a period including immediately before an interruption and immediately after and interruption of primary power. The flywheel system uniquely utilizes an extremely large field coil, which is preferably 25–50% of the weight of the flywheel. The increased field coil size allows for both full standby energization without overheating and also reduces the armature reaction such that full power is available during a power interruption without requiring instantaneous increasing of the field coil current. In one embodiment, the field controller has a speed sensor for monitoring rotational speed of the flywheel and for varying electrical power to the field coil, without monitoring the primary power for interruptions. The field controller varies electrical current to the field coil approximately inverse linearly with the rotational speed of the flywheel during both standby and discharging operation to govern power to the field coil during standby operation such that the back emf of the armature remains substantially constant during an interruption of power.

20 Claims, 9 Drawing Sheets

U.S. PATENT DOCUMENTS

| | | | |
|---|---|---|---|
| 5,955,816 A | * 9/1999 | Clifton et al. | 310/261 |
| 5,969,457 A | * 10/1999 | Clifton et al. | 310/216 |
| 6,023,152 A | 2/2000 | Briest et al. | 323/207 |
| 6,118,202 A | 9/2000 | Pinkerton | 310/178 |
| 6,166,472 A | * 12/2000 | Pinkerton et al. | 310/208 |
| 6,720,674 B1 | * 4/2004 | Gabrys | 307/68 |
| 6,819,012 B1 | * 11/2004 | Gabrys | 307/68 |
| 6,870,277 B1 | * 3/2005 | Pavlykivskyj | 290/1 R |
| 6,882,072 B1 | * 4/2005 | Wingett et al. | 310/74 |
| 6,897,587 B1 | * 5/2005 | McMullen et al. | 310/90.5 |

* cited by examiner

ONLINE ALTERNATOR FLYWHEEL SYSTEM

This is related to U.S. Provisional Application No. 60/394,505 filed on Jul. 9, 2002 and entitled "Online Alternator Flywheel System".

This invention pertains to flywheel energy storage systems and more particularly to a flywheel system that is capable of providing instantaneous power protection in conjunction with a controllable output for increased energy extraction. The invention allows increased power protection while having less costly and complicated control and implementation.

BACKGROUND OF THE INVENTION

Flywheel energy storage systems have emerged as an alternative to electrochemical batteries for storing energy with many advantages including higher reliability, longer life, lower or no maintenance, higher power capability and environmental friendliness. Flywheel energy storage systems store energy in a rotating flywheel that is supported by a low friction bearing system inside a chamber. The chamber is usually evacuated to reduce losses from aerodynamic drag. The flywheel is accelerated for storing energy and decelerated for retrieving energy through use of a motor/generator attached to the flywheel. Power electronics maintain the flow of energy in and out of the system and can prevent power interruptions or alternatively manage peak loads. When used in uninterruptible power supplies, flywheel systems employ a continuously rotating flywheel that is readily available to be slowed for providing power during an interruption of primary power.

Several possible flywheel system configurations can be constructed including permanent magnet excited and field coil excited. Permanent magnet type motor generators utilize permanent magnets to provide field flux. They can efficiently provide power instantaneously during an interruption because they do not require power for generation of flux and the flux is always produced. Many designs have extremely low inductance, which beneficially limits any voltage drop from armature reaction when high power current is extracted. Unfortunately, the voltage from permanent magnet motor-generators drops as the flywheel speed slows. To extract a large portion of the energy in flywheels to supply a load, complex and costly electronics have always been required.

Field coil excited flywheel systems utilize current applied to a field coil to generate field flux. Because the field coil current can be controlled, the current can be increased as the flywheel speed slows. This allows extraction of significantly more useable energy from the flywheel. However, such designs have higher losses in order to provide field coil excitation as well as increased magnetic losses in many cases. They also provide less than instantaneous full power when operated with a reduced field coil energization during standby for reducing losses. A time lag occurs from sensing a power interruption and then increasing the field current in order to generate full power to supply the load. The inductance time constant of the field coil itself accounts for much of the delay. Such flywheel systems also require both a complex and costly power monitoring system and may not provide complete protection against power interruptions.

SUMMARY OF THE INVENTION

Accordingly, the invention provides an improved flywheel energy storage system for preventing power interruptions to a load from interruptions of primary power. The flywheel system simultaneously provides instantaneous power protection and a controllable output for extraction of more of the energy from the flywheel.

The flywheel energy storage system comprises a flywheel that is supported for rotation about an axis on a bearing system, and a motor-generator having a rotor coupled with the flywheel, and a stator. The motor-generator has multiple stationary armature windings and a field coil. The field coil generates flux that passes through the armature windings as the rotor rotates. A synchronous inverter connected to a DC buss, which receives rectified primary power from a rectifier connected to the primary power, excites the armature windings. A field controller maintains power to the field coil during standby operation such that the current to the field coil remains substantially constant during a period including immediately before an interruption of primary power and immediately after an interruption of primary power.

Unlike previous field coil flywheel systems that have relied on rapid ramping current capability to the field coil in order to quickly respond to an interruption of power, flywheel systems according to this invention do not require rapid ramping of field coil current to a reduced inductance field coil when a power interruption occurs. Such previous designs precluded field coil overheating by operating at high field coil power only briefly, for 15–30 seconds during a power interruption. In contrast, the field coil of the invention flywheel system is kept energized in standby operation so full power can be instantaneously provided when a power interruption occurs, and without instantaneously increasing the field coil current.

The application of high current to the field coil during standby operation (when power is not interrupted) disadvantageously produces significantly increased standby power dissipation of the flywheel system and heat that must be removed. The field controller preferably provides a standby field current to the field coil such that the back emf of the armature windings is at least 75% of the DC buss voltage. More preferably, the standby back emf is equal to nearly 100% of the DC buss voltage. Therefore, when primary power is interrupted, the back emf available to supply to the DC buss is nearly equal to the normal DC buss voltage, without instantaneously increasing the field coil current.

Such full field coil standby energization alone, however, is insufficient to achieve instantaneous full power delivery capability. When high power discharge current is drawn from the armature windings, armature reaction will occur that reduces the field flux through the armature windings and lowering the back emf. Further, the resistive voltage drop in the armature windings will also reduce the voltage supplied to the DC buss.

Several added embodiments of the invention are provided to overcome both the increased standby power loss and the instantaneous voltage drop when a power interruption occurs. The field coil is constructed substantially larger than in previous field coil flywheel systems. In weight terms, the field coil preferably weighs more than 25% of the flywheel weight and more preferably greater than 40%. For example, a flywheel system with a 150-pound flywheel utilizes a field coil weighing as much as 70 pounds. The field coil preferably has a weight, Wfc, in pounds for a flywheel system with 15 second useable power capability, P, in kilowatts such that Wfc/P≧0.60. Although the outsized field coil does increase somewhat the construction costs of the flywheel system, it substantially reduces the field coil power dissipation such that it can operate continuously with full back emf standby energization without overheating.

The unique size field coil provides a secondary benefit by also achieving a substantial reduction in the motor/generator armature reaction. This allows for full power to be realized without an instantaneous increase in the field coil current when a power interruption occurs. The ratio of the field coil inductance to the armature phase inductance controls how much the field flux will be reduced along with the back emf when high power current is drawn. The oversized field coil substantially increases the field coil inductance.

To further minimize the armature reaction, the magnetic airgaps can be made exceptionally large, up to one half inch or greater. This reduces the inductance of both the armature phase windings and the field coil and increases the required magnetomotive force required from the field coil for a given induced armature voltage. The resulting flywheel system has a field coil inductance, Ifc, and an armature phase inductance, Iap, preferably such that Ifc/Iap≧25,000 and more preferably greater than 100,000.

In further embodiments of the invention, the flywheel system utilizes air core armature windings to reduce both the armature phase inductance and also reduce magnetic induced losses. In a preferable construction, the air core armature is located within a magnetic airgap created by the rotor such that the armature windings are bounded on both sides by rotating surfaces of the rotor. This construction eliminates the need for electrical laminations as well as their costs and the eddy current and hysteresis losses that would be generated. In a further preferred configuration, the flywheel system is constructed such that the field flux only crosses a single magnetic airgap, which includes the air core armature windings. Use of single magnetic airgap eliminates magnetically induced bearing loads in the flywheel system and also allows for larger armature winding conductors that reduce the resistive voltage drop and losses. One drawback of this particular construction is, however, more difficult field coil heat transfer.

During an interruption of primary power and when the flywheel is supplying power, the field current is slowly increased to the field coil as the flywheel slows. This prevents the voltage supplied by the armature windings from dropping as the flywheel speed slows. The field controller can utilize a voltage feedback loop or alternatively other methods that allow the flywheel system to maintain a high output voltage during discharge for extraction of more energy.

In a further embodiment of the invention, the flywheel system utilizes a speed based field coil controller to allow extraction or more useable energy from the rotating flywheel when discharging. The field controller further achieves lower costs and less complicated control and implementation by the field controller exclusively monitoring the flywheel speed. The field controller varies the current to the field coil approximately inverse linearly with flywheel speed during discharge operation. The flywheel device thereby functions as an online battery system that is ready for providing discharge energy regardless of the condition of primary power and without the need for adding monitoring for interruptions in primary power. The flywheel system emulates a battery by maintaining a relatively constant output voltage instantaneously during an interruption and while discharging. The invention allows simpler and easier implementation of the flywheel system into new and existing uninterruptible power supplies because it functions more like a conventional battery.

Although flywheel systems in accordance with the invention can provide improved power interruption protection for online double conversion uninterruptible power supplies, many of the benefits of the invention, including lower costs, less complicated construction and easier implementation, can also be realized when using the flywheel system in offline uninterruptible power supplies. Such uninterruptible power supplies also require near instantaneous power supply from the flywheel to prevent unacceptable power interruptions.

DESCRIPTION OF THE PREFERRED EMBODIMENT

Figure 1:
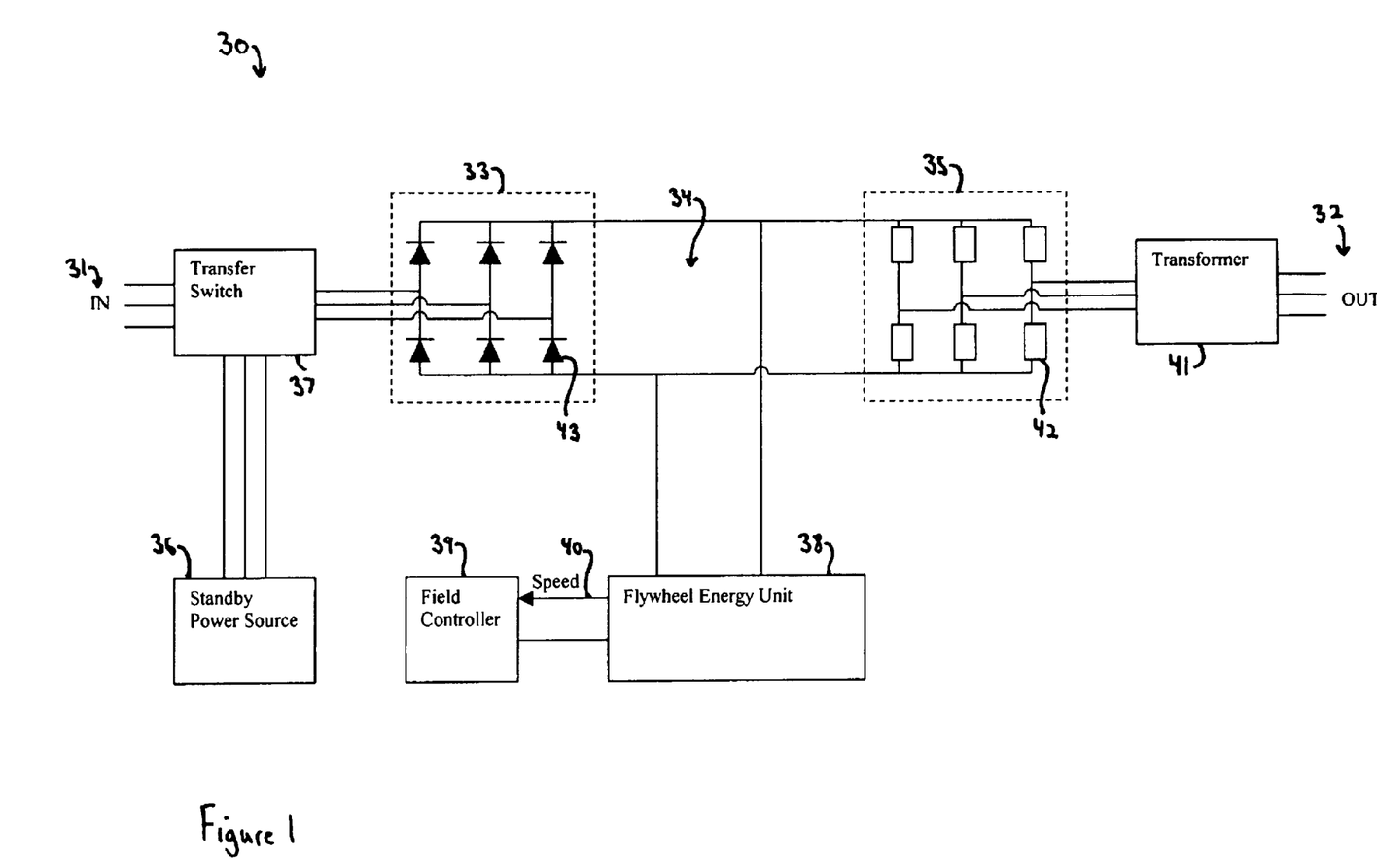
FIG. 1 is a schematic drawing of a power system for supplying uninterrupted power in accordance with the invention.

Turning to the drawings, wherein like reference characters designate identical or corresponding parts, and more particularly to FIG. 1 thereof, a power system 30 for supplying uninterrupted power is shown having a primary electrical power input 31 and an output 32 to a protected load. The input power 31 is rectified by a rectifier 33 and supplied to a DC buss 34. The rectifier 33 can be controlled or uncontrolled and constructed of diodes or thyristors 43. Power in the DC buss 34 is inverted through an inverter 35 and supplied to the power output 32. Capacitors, not shown, may also be connected across the DC buss 34 to smooth power by providing some capacitive energy storage. The inverter 35 is constructed with individual transistors 42 to convert the DC power to AC power as is known in the art. Although a 4-quadrant inverter can be utilized that can boost the flywheel voltage, the instantaneous full power capability of the invention allows for use of a much cheaper single quadrant inverter. Power flows backwards through the inverter 35 to the DC buss 34 by rectifier diodes in the inverter or use of a separate rectifier, not shown. A transformer 41 can be included to provide isolation or power correction.

When the primary power 31 is interrupted, a standby power source such as a generator set is switched on and the primary power 31 is disconnected from the input lines 31 by a transfer switch 37. Unfortunately, when there is an interruption of primary power, the generator set 36 typically takes 15 seconds or more to start and stabilize to begin providing power. An interruption of power of this duration over output lines 32 to the protected load is often unacceptable. The power system 30 prevents any interruption to the output power 32 by utilizing a flywheel energy unit 38. In accordance with the invention, the flywheel system 38 is online and readily capable of supplying power to the DC buss 34 when primary power 31 is interrupted and before the standby power source 36 begins providing power.

Figure 6:
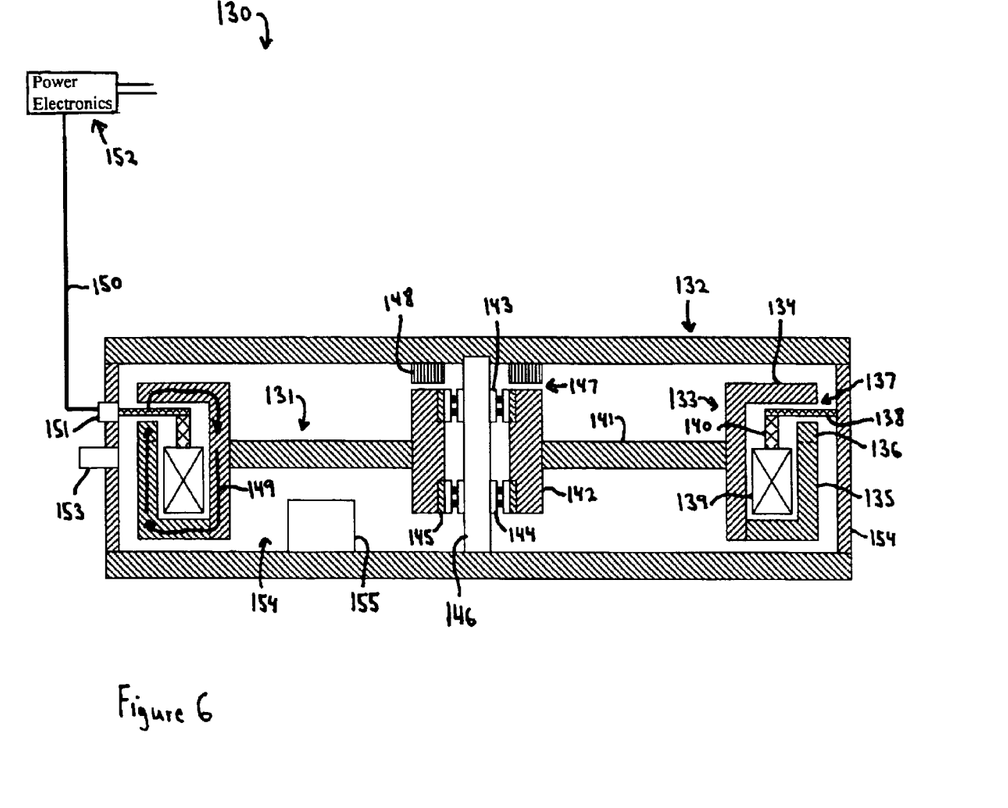
FIG. 6 is a schematic drawing of a flywheel energy storage system in accordance with the invention.

The flywheel system 38 has multiple stationary armature windings and a field coil, as illustrated in one embodiment of such a flywheel system in FIG. 6. A field controller 39 controls the current to the field coil. To accelerate the flywheel during charging and in standby mode, the armature windings are energized by synchronous power that is converted from the DC buss through motor drive electronics in the flywheel energy unit 38. During an interruption of power in the input lines 31, the motor drive electronics instantly and automatically supply the synchronous voltage of the armature windings back to the DC buss 34. The flywheel system 38 provides power back to the DC buss 34 whenever the back emf of the armature windings is greater than the voltage of the DC buss 34.

To operate online with no interruption of power, the field controller 39 provides high current to the field coil during standby operation such that the current to the field coil can remain substantially constant during the period including immediately before an interruption of primary power and immediately after an interruption of primary power. The back emf of the armature windings is equal to at least 75% of the DC buss voltage and more preferably nearly 100%. Operating in standby with field current for full back emf can result in significantly higher system losses and overheating. Further, a high standby field coil current alone is insufficient to provide instantaneous full power protection. Armature reaction will reduce the back emf when high current is drawn from the armature and the resistive armature voltage drop will further reduce the voltage supplied to the DC buss. These losses can be reduced and instantaneous full power achieved in accordance with the invention as described below.

To allow for continuous full back emf energization of the field coil in standby operation, the field coil is built to substantially reduce the field coil power consumption and heating, allowing for continuous operation. Increasing the gauge or strand count in the windings in the field coil to reduce the power consumption results in an increased field coil weight of greater than 25% of the weight of the flywheel and more preferably greater than 40% of the weight of the flywheel. By another comparison, the field coil has a weight Wfc in pounds, and the flywheel energy storage system has a 15 second output power capability P in kilowatts, wherein Wfc/P>0.60.

The outsized field coil provides a secondary benefit by reducing the armature reaction and hence the amount of drop in the back emf when high power current is drawn from the armature windings during an interruption of primary power. This allows for full power to be realized without an instantaneous increase in the field coil current when a power interruption occurs. The ratio of the field coil inductance to the armature phase inductance controls how much the field flux will be reduced along with the back emf when high power current is drawn. The oversized field coil windings dramatically increases the field coil inductance. To further minimize the armature reaction, the magnetic airgaps in the motor-generator can be made exceptionally large, up to one half inch or greater. This reduces the inductance of both the armature phase windings and the field coil and increases the required magnetomotive force required from the field coil for a given induced armature voltage. The resulting flywheel system has a field coil inductance, Ifc, and an armature phase inductance, Iap, preferably such that Ifc/Iap≧25,000 and more preferably greater than 100,000.

During a power interruption and when the flywheel is supplying power to the load, the field coil slowly increases the field current such that the DC buss voltage does not drop with the flywheel speed. Although the field controller can operate by voltage loop feedback or other means that regulates the output voltage, one preferred method for operation is to control the field current based on flywheel speed during standby and discharge operation. The field controller 39 monitors the rotational speed of the flywheel and varies the power to the field coil to maintain a substantially constant back emf in the armature windings as the rotor rotates. The field controller 39 takes in a speed input signal 40 from a flywheel speed sensor (not shown) and varies the current to the field coil approximately inverse linearly with the flywheel speed during discharging operation. Therefore the back emf remains substantially constant as the flywheel speed drops during discharging for extraction of more usable energy from the flywheel, and the flywheel is also readily available to supply power during standby without any delays. The flywheel system 38 thereby acts like a battery and is easily implemented in new and existing uninterruptible power supplies. The flywheel need not require a complex and costly power monitoring system for sensing power interruptions and no delay occurs in supplying power when needed. The field current can also utilize the speed control during recharging operation, if desired. Reducing the field current as the flywheel is accelerated for charging provides increased field flux at low speeds and faster recharging.

Figure 2:
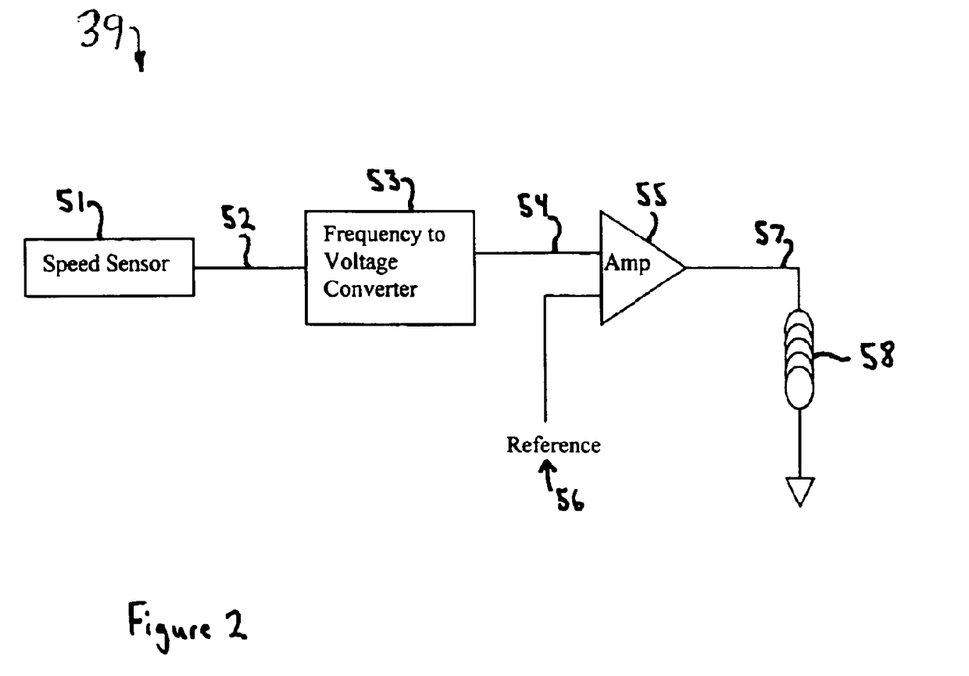
FIG. 2 is a schematic drawing of a field controller in accordance with the invention.

The field controller 39, shown in FIG. 2, has a speed sensor 51 that provides a frequency signal 52 to a frequency-to-voltage converter 53 that creates a voltage signal 54. The voltage signal 54 is input into an inverting amplifier 55 to provide the output field current 57 to the field coil 58. A reference signal 56 provides set point for correlating the field current with speed. As shown and in accordance with the invention, the flywheel field current is governed only by the flywheel speed, regardless of the condition of primary power, for online and lower cost and less complicated operation. For online operation, the field controller need not control the field current when the flywheel is charging, if desired. However, when the field controller controls the field coil also during charging, the flywheel can be accelerated or recharged at the fastest rate. The higher the field current, the greater the acceleration torque. The field controller reduces the field current as the speed increases thereby insuring that the back emf stays below the synchronous voltage applied to the armature windings in order for charging to occur. The field controller can maintain the back emf equal with the DC buss voltage so that DC buss voltage is equal during standby and discharging. The field controller in this case could also control the charged speed of the flywheel. Alternatively, the field controller can maintain the back emf somewhat below the DC buss voltage, but above the minimum required by the output converter to supply output power. This allows somewhat reduced field coil power consumption but it requires the output converter to be able to handle higher current from the reduced voltage. Some reduction in voltage also occurs from the discharging current through the flywheel system electronics.

Figure 3A:
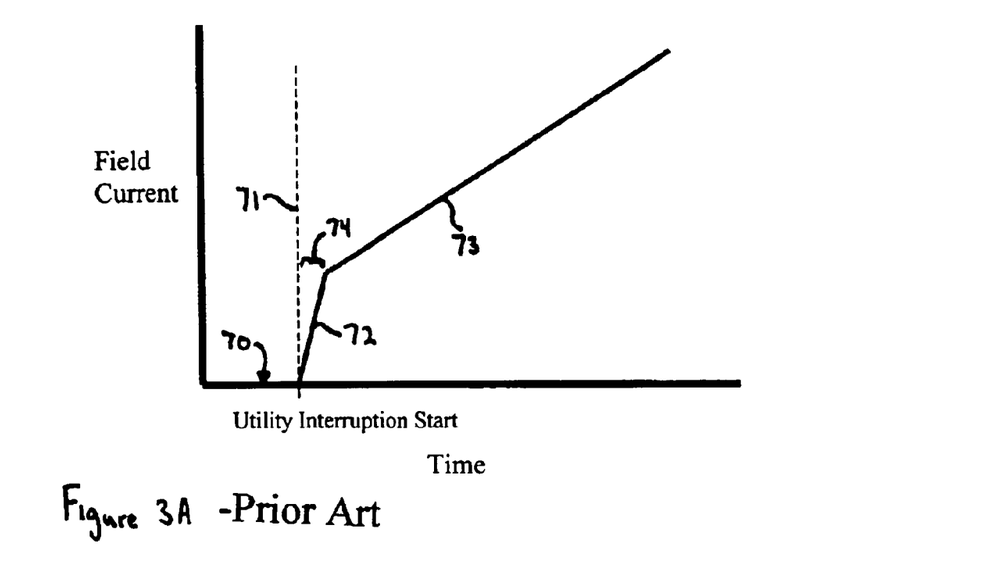
FIG. 3A is a plot of field current before and after power interruptions for a flywheel system of prior art.
Figure 3B:
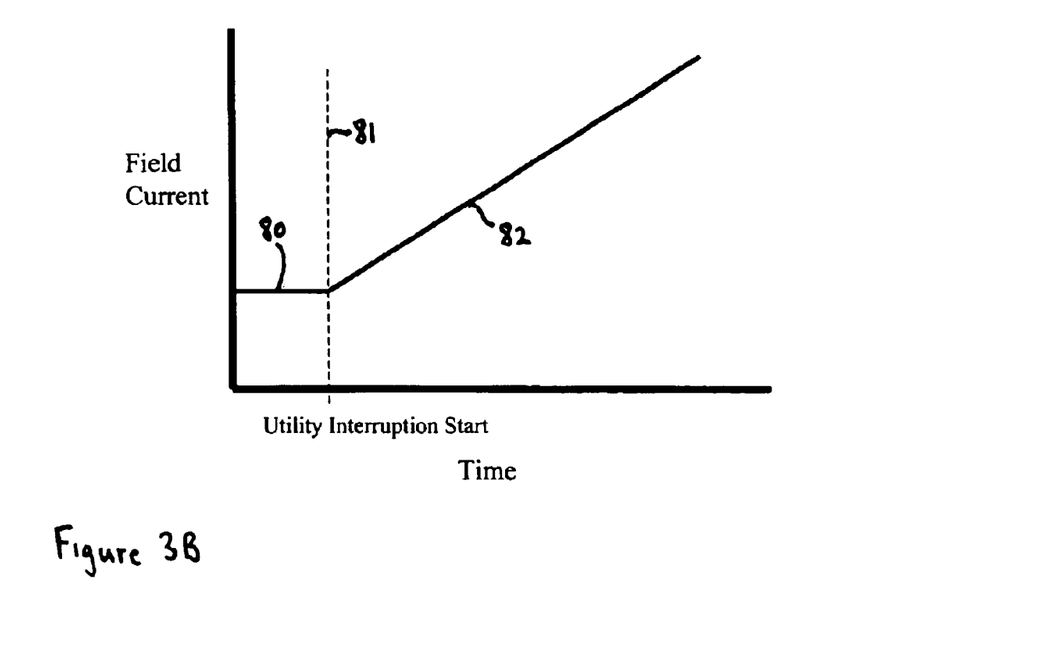
FIG. 3B is a plot of field current before and after power interruptions for a flywheel system in accordance with the invention.

Plots of field current before and after power interruptions for a flywheel system of prior art and for a flywheel system in accordance with the invention are shown in FIGS. 3A and 3B, respectively. FIG. 3A shows a prior art flywheel system where the preinterruption field current 70 is off or at a reduced level. When a power interruption occurs at 71 and is detected, the field current is ramped up at 72 so that the flywheel system can supply output power. The ramp-up of the field current 72 has a certain delay period 74 that is caused from electronic sensing switching and the ability to rapidly increase the current through the inductance of the field coil. As the flywheel speed slows during discharging, the discharging field current 73 is slowly increased to provided a substantially constant output voltage.

The field current of a flywheel system in accordance with the invention is shown in FIG. 3B. The preinterruption field current 80 is maintained at a level for full or near full back emf in the armature windings. When a power interruption occurs at 81, there is no delay in supplying output power. The field controller slowly increases the discharging field current 82 approximately inverse linearly with the flywheel speed to extract more useable energy from the flywheel.

Figure 4A:
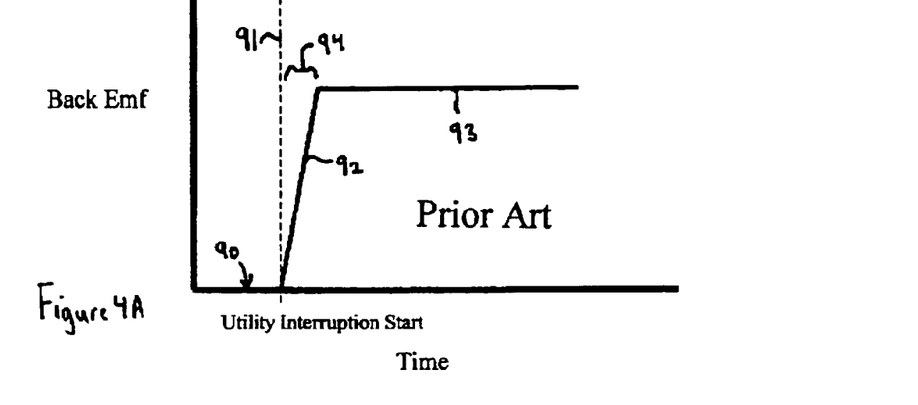
FIG. 4A is a plot of back emf before and after power interruptions for a flywheel system of prior art.

A plot of back emf before and after power interruptions for a flywheel system of prior art is shown in FIG. 4A. The preinterruption back emf 90 is at a reduced value. When the interruption occurs at 91, the ramping of the field current causes a ramp 92 of the back emf and a delay 94 before the reaching the level of the discharge back emf 93.

Figure 4B:
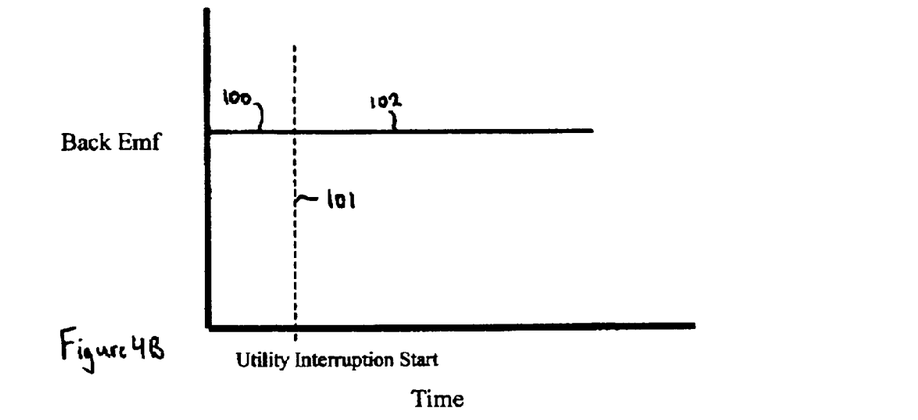
FIG. 4B is a plot of idealized back emf before and after power interruptions for a flywheel system in accordance with the invention.

A plot of idealized back emf before and after power interruptions for a flywheel system in accordance with the invention is shown in FIG. 4B. The preinterruption back emf 100 is maintained to be equal with the discharge back emf 102. When the interruption 101 occurs, the back emf that provides power to the DC buss remains constant.

Figure 4C:
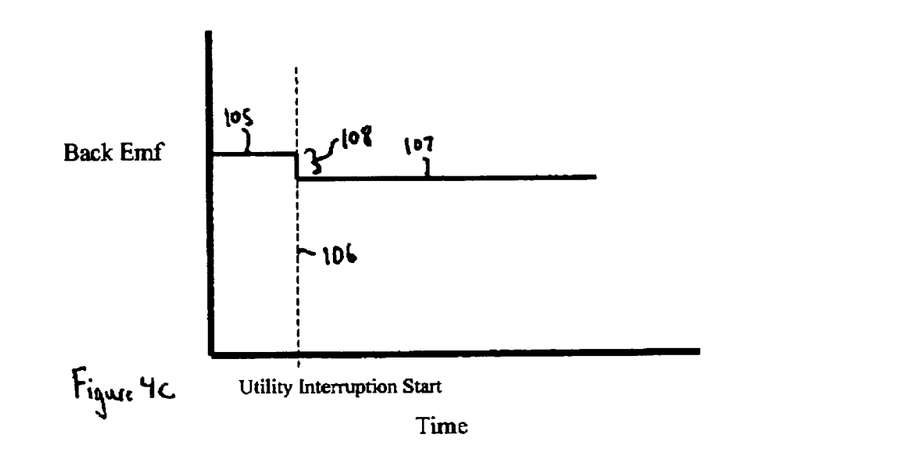
FIG. 4C is a plot of back emf before and after power interruptions for a flywheel system in accordance with the invention.

A plot of back emf before and after power interruptions for a flywheel system in accordance with the invention is shown in FIG. 4C. The actual back emf will be affected to some extent by armature reaction in which current drawn from the armature reduces the field flux through the armature windings. However, the embodiments of the invention described minimize this effect to allow for constant field coil current operation. The preinterruption back emf 105 is maintained to be approximately equal with the DC buss voltage. The discharge back emf 107 is however only slightly lower than the preinterruption or standby back emf 105. The drop 108 in back emf from discharging is made small by the uniquely high ratio of field coil to armature phase inductances.

Figure 5A:
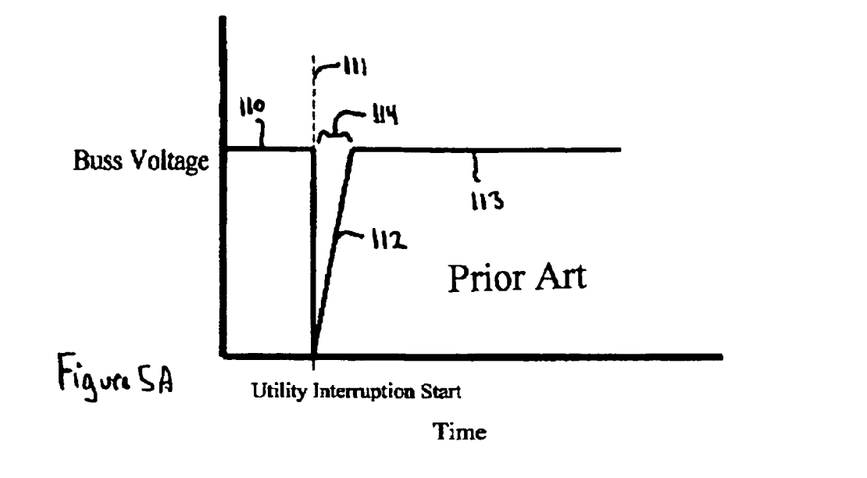
FIG. 5A is a plot of buss voltage before and after power interruptions for a flywheel system of prior art.
Figure 5B:
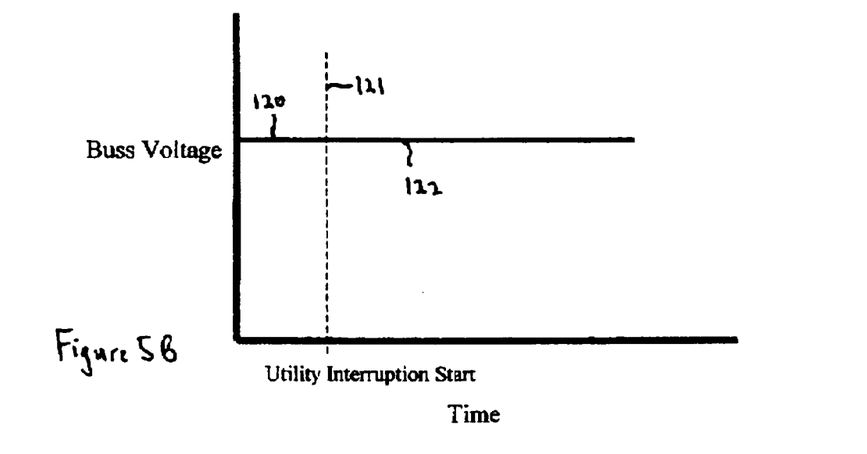
FIG. 5B is a plot of idealized buss voltage before and after power interruptions for a flywheel system in accordance with the invention.

A plot of buss voltage before and after power interruptions for a flywheel system of prior art is shown in FIG. 5B. The preinterruption buss voltage 110 is maintained at the normal level by power supplied from the primary power. When an interruption occurs at 111, the ramping of the field current causes a ramp 112 in the buss voltage and a delay 114 before reaching the discharging buss voltage 113.

A plot of idealized buss voltage before and after power interruptions for a flywheel system in accordance with the invention is shown in FIG. 5B. The preinterruption buss voltage 120 is maintained at normal operating level by primary power. When an interruption 121 in the primary power occurs, the flywheel system back emf was already at full level and hence supplies the discharging buss voltage 122 without an interruption.

Figure 5C:
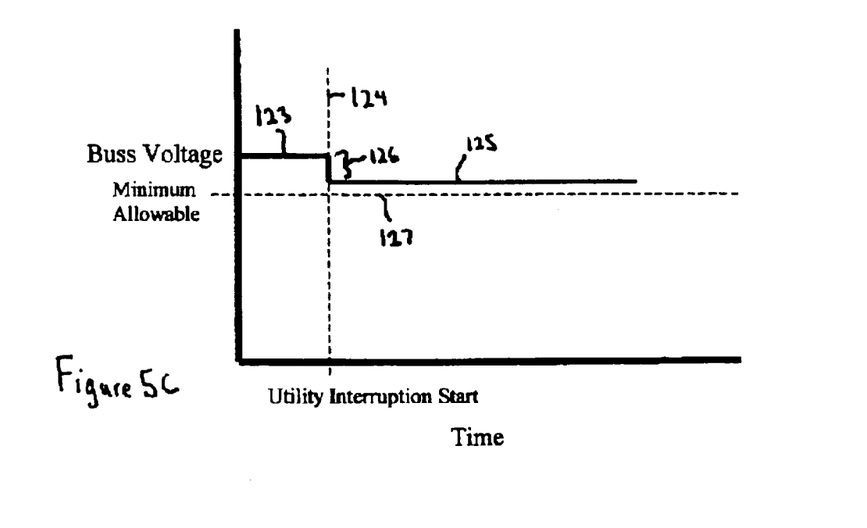
FIG. 5C is a plot of buss voltage before and after power interruptions for a flywheel system in accordance with the invention.

In actuality, some drop in voltage occurs due to both the armature reaction and the resistive voltage drop in the armature and rectifier. A plot of buss voltage before and after power interruptions for a flywheel system in accordance with the invention is shown in FIG. 5C. The preinterruption buss voltage 123 is maintained at approximately equal to the DC buss voltage. When an interruption 124 in the primary power occurs, the flywheel system provides slightly reduced voltage power 125 to the DC buss. A small voltage drop 126 occurs because of the load being applied to the armature windings. The voltage drop 126 is minimized by the embodiments of the invention. The discharge voltage 125 remains above the acceptable full power output voltage limit 127, which is typically controlled by the output inverter. Most output inverters can tolerate a voltage drop of up to 20–30%. No interruption in power occurs to the DC buss when primary power is interrupted.

To reduce standby losses from online operation, several design features are preferably implemented in the construction of the flywheel system. The flywheel system preferably reduces losses by locating the field coil on the stator and producing homopolar flux in protrusions located around a circumference on the rotor. The homopolar flux reduces eddy current and hysteresis loses that could otherwise occur in conventional heteropolar designs. Losses are preferably further reduced by using air core armature windings as opposed to windings having ferromagnetic cores. Standby losses are preferably even further reduced by utilizing a design in which ferromagnetic portions of the stator are substantially free of circumferentially varying flux as the rotor rotates. To accomplish this, the air core armature is preferably located in an air gap that is formed between two surfaces of the rotor. The necessary use of laminations of other designs that can give rise to 3–4% losses is also eliminated by eliminating circumferentially varying flux in the stator. To reduce the power consumption of the field coil current, the field coil is be made large, with a high number of turns of larger diameter copper wire. For low losses, the field coil, which can be one coil or multiple coils acting together, preferably has a ratio of the weight in pounds divided by the maximum output power of the flywheel energy storage system in kilowatts is greater than 0.6. For instance, a 250 kW flywheel system in accordance with the invention can be made to have a standby field current power loss of only 400 watts. Other system losses will however add to the field coil power consumption to reduce the efficiency. The large field coil also has lower electrical resistance, reducing heat generation during both standby and discharging making the system cooling requirements easier. Forced air convention can be replaced with natural convention in non-evacuated applications, for simpler and more reliable operation.

A schematic drawing of a flywheel energy storage system as described above is shown in FIG. 6, having a rotor 131 rotating relative to a stationary stator 132. The rotor 131 is constructed of an outer hollow rim 133 constructed from at least two pieces 134 and 135, and a hub 141 attaching the rim 133 to a center tube 142. The flywheel 131 is journalled for rotation about a center shaft 146 on upper and lower mechanical bearings 143, 144 that have compliant mounts 145. A magnetic bearing 147 employing a permanent magnet 148 lifts the majority of the weight of the flywheel 131 to extend the life of the mechanical bearings 143, 144. Other bearing systems could also be used. The flywheel outer rim 133 forms an armature air gap 137 in which is located an air core armature 138 that is mounted to the stator 132. An annular field coil 139, attached to the air core armature 138 on a support 140, generates homopolar flux in a flux path 149 through the rim 133. The homopolar flux 149 magnetizes multiple axially extending protrusions 136 regularly spaced apart around the circumference facing the armature air gap 137. As the rotor 131 rotates, the flux in the flux path 149 induces a back emf in the air core armature 138.

The rotor 131 is enclosed in a sealed container 154 and wires 150 exit the container 154 through a sealed connection 151 and connect to external power electronics 152. The container 154 is maintained with at internal vacuum with a getter pump 155 to reduce aerodynamic drag. A pinch off tube 153 provides for establishing the initial vacuum and sealing the container 154.

Figure 7:
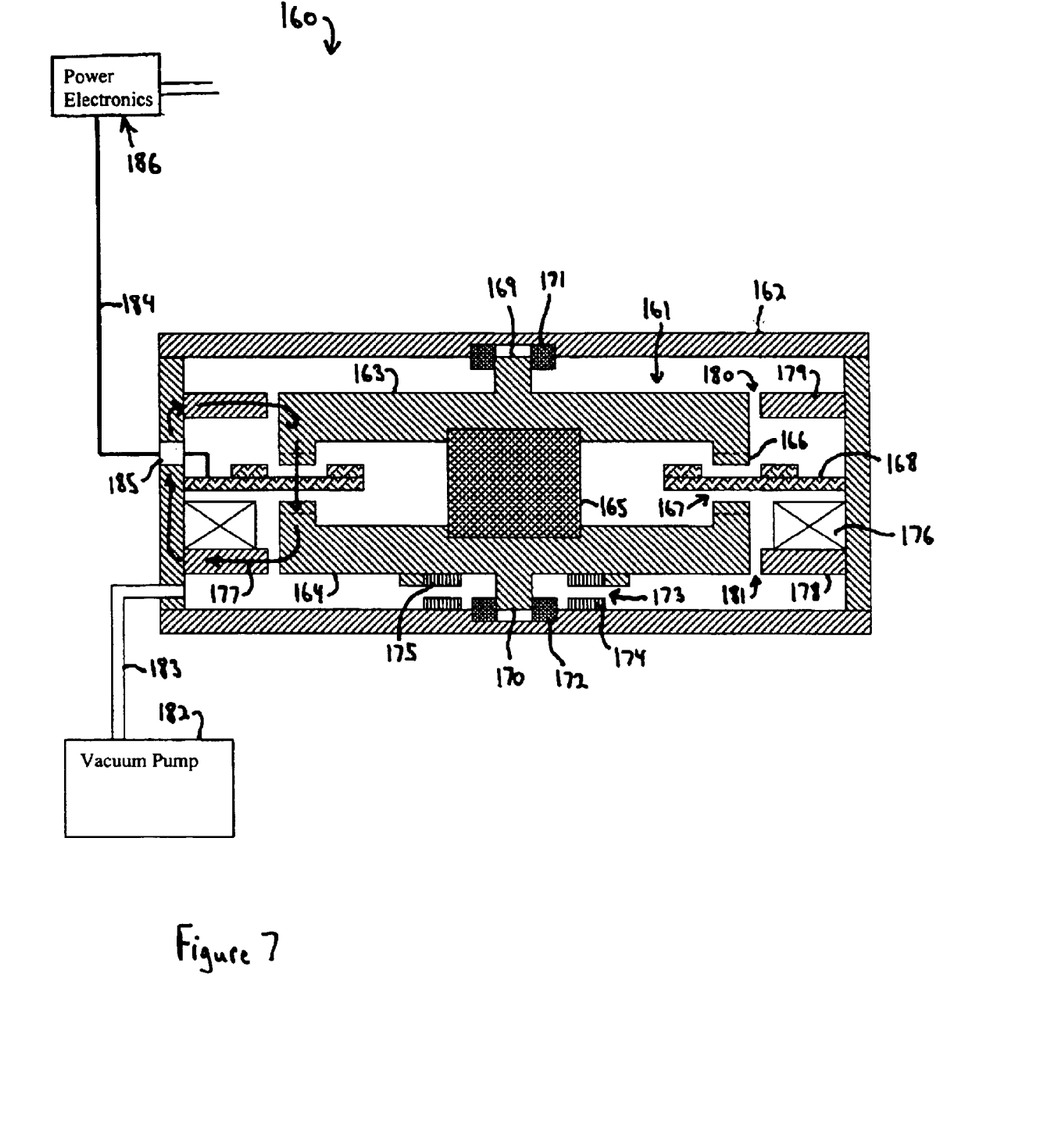
FIG. 7 is a schematic drawing of an alternate configuration flywheel energy storage system in accordance with the invention.

An alternate configuration flywheel energy storage system 160, shown in FIG. 7, includes a rotor 161 rotating relative to a stationary a stator 162. The rotor is constructed of two ferromagnetic rotor portions 163, 164 that are separated by a magnetic insulator 165 to form an axial armature air gap 167 between the two portions. The rotor 161 is journalled for rotation using shafts 169, 170 in upper and lower mechanical bearings 171, 172. A magnetic bearing 173 carries the weight of the rotor 161 by using stationary permanent magnets 174 on the stator in repulsion with rotating permanent magnets 175 on the rotor. An air core armature 168 is attached to the stator container 162 and extends radially into the axial armature air gap 167. One or both of the two ferromagnetic rotor portions 163, 164 contain multiple axially extending protrusions 166 spaced apart in a regular array around the circumference facing the armature air gap 167. An annular field coil 176 mounted with the stator 162 drives flux in a toroidal flux path 177 to and from the rotor 161 and across the air gap 167, inducing a back emf in the air core armature 168. One benefit of this design is improved heat transfer from the field coil 176 to the container 162 to maintain a low operating temperature. The drawback is inclusion of extra non-armature magnetic air-gaps between the rotor 161 and the yoke poles 178, 179.

The stator 162 comprises annular yoke pieces 178 and 179 that conduct the flux 177 from the field coil 176. Because the yoke pieces 178, 179 are located away from the protrusions 166, the stator is not subjected to circumferentially varying flux as the rotor 161 rotates and therefore has low standby losses even with online operation. The leads 184 from the armature 168 and field coil 176 exit the container 162 to external power electronics 186 through a feedthrough 185. An external vacuum pump 182 connected to the container 162 through a vacuum pumping port 183 maintains the internal vacuum.

Figure 8:
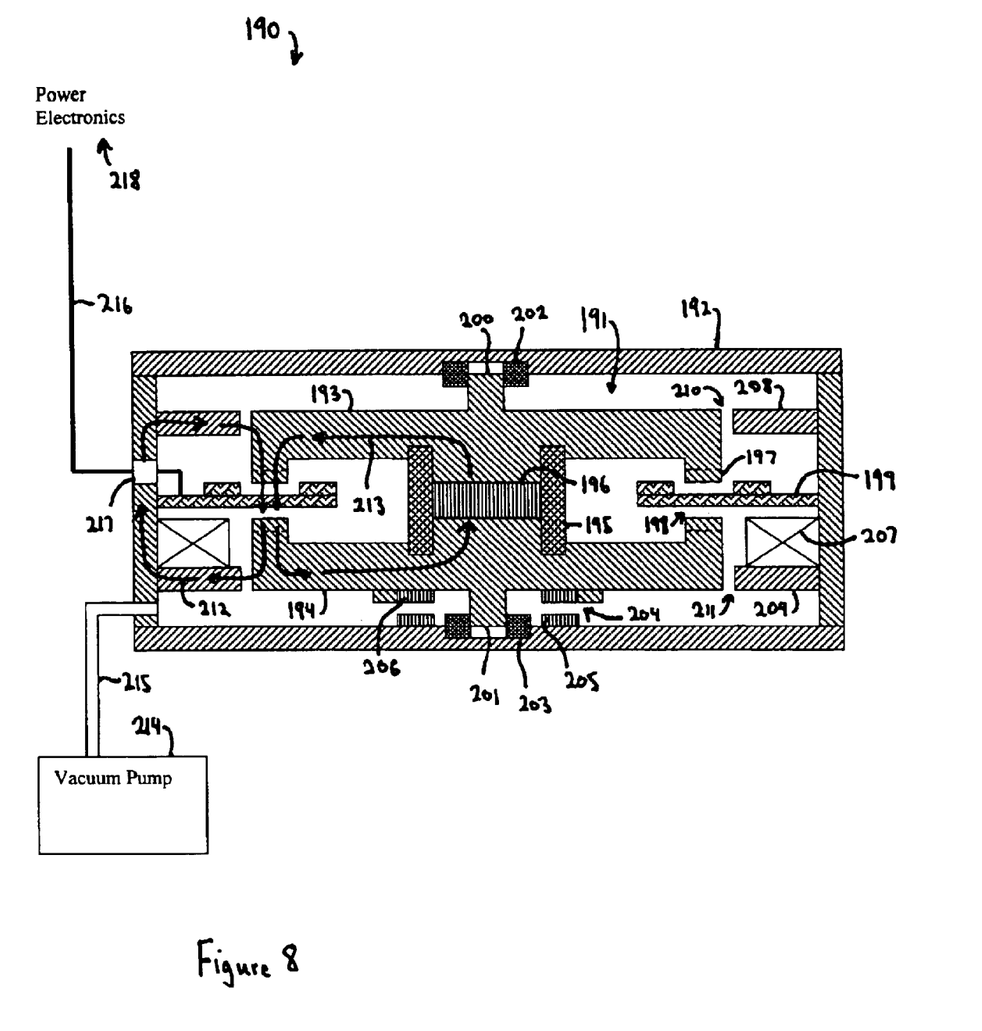
FIG. 8 is a schematic drawing of a second alternate configuration flywheel energy storage system in accordance with the invention.

In another embodiment of the invention, shown in FIG. 8, the field coil power consumption is further reduced by using permanent magnets and a hybrid design for the alternator motor in a flywheel energy storage system 190 having a rotor 191 and a stator 192. The rotor 191 is constructed of two ferromagnetic rotor portions 193, 194 that are separated to define therebetween an axial armature air gap 198. The ferromagnetic rotor portions 193, 194 have multiple axially extending protrusions 197 around an outer circumference, forming poles facing the armature air gap 198. A permanent magnet 196 drives a permanent magnet flux through a permanent magnet flux path 213 and a stationary field coil 207 generates a field coil flux, which flows through a field coil flux path 212. Both flux paths 212, 213 include the armature air gap 198 and the combined flux induces a back emf in an air core armature 199 located in the armature air gap 198 as the rotor 191 rotates. The field coil flux path 212 links the rotor 191 through upper and lower yoke pieces 208, 209.

The rotor 191 is supported for rotation on shafts 200, 201 that are journalled in bearings 202, 203. A magnetic bearing 204 using repulsion between a stationary magnet 205 and a rotating magnet 206 lifts the weight of the flywheel 191. The permanent magnet flux in the flux path 213 reduces the amount of field coil flux 212 that must be generated which can further reduce the standby power consumption of the field coil 207. The system wiring 216 exits the container 192 through a sealed connection 217. A vacuum pump 214 connected to the container 192 through a vacuum pumping port 215 maintains the internal vacuum.

Figure 9:
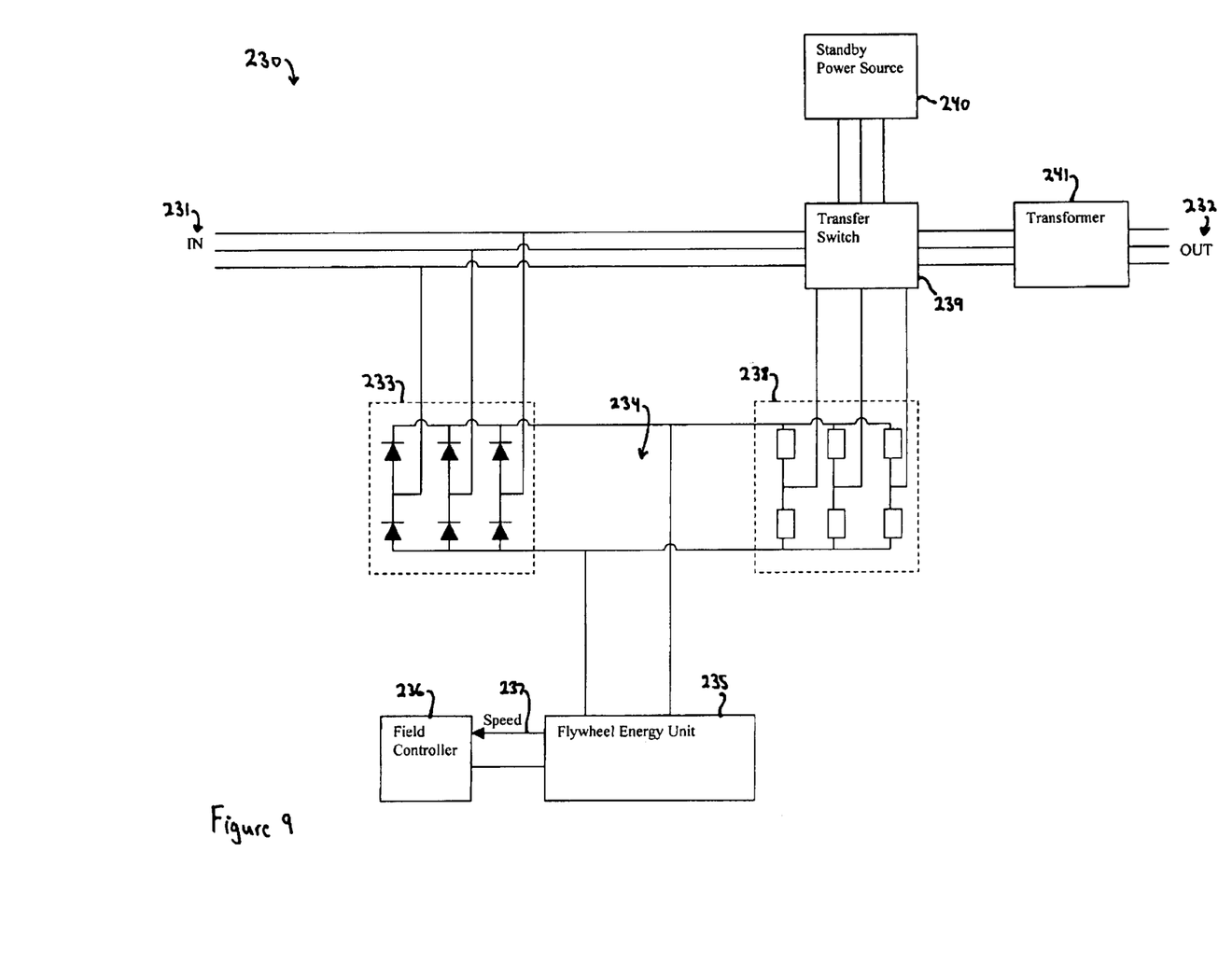
FIG. 9 is a schematic drawing of an alternate configuration power system for supplying uninterrupted power in accordance with the invention.

Although the invention is very well suited for online or double conversion type uninterruptible power supplies because it supplies power instantly without any delay, it is also applicable for use with off line or line interactive uninterruptible power supplies. Such UPS require near instantaneous power delivery capability (about 4 ms transfer time) to maintain functioning of the load. The benefits include less complication, lower cost and easier implemented construction. Such a power system 230 for an off line configuration uninterruptible power supply, shown in FIG. 9, receives primary input power via lines 231, and delivers output power to a protected output load via output lines 232. When the primary power in lines 231 is operating, it is supplied directly to the output lines 232. When an interruption occurs in the primary power, the transfer switch switches to either the standby power source 240 or to the flywheel energy unit 235. When a standby power source 240 is included and is a generator set, it takes approximately 15 seconds or more to start and come online. Therefore, when an interruption of primary power 231 occurs, the transfer switch 239 switches to the flywheel system 235 to provide power to the load 232. The flywheel system 235 is continuously charged through a rectifier 233 connected to the primary power lines 231. The rectifier 233 supplies power to a DC buss 234 that charges the flywheel unit 235. During an interruption of primary power, the flywheel unit instantly provides power to the DC buss 234, and the power is inverted in an inverter 238 and supplied to the load 232. A transformer 241 can be included for isolation and or power correction. Although shown as a static inverter, the inverter 238 could also be a rotary type. The flywheel unit 235 has a field controller 236 that takes a speed signal 237 and controls the field current to maintain a substantially constant back emf during both standby and discharging. If a standby generator 240 is provided, it is switched on to supply power to the output lines 232 through the transfer switch 239 when ready, assuming the interruption of primary power continues. Although illustrated for use with AC power systems, the flywheel energy storage system is also applicable for DC power systems. The flywheel unit 235 thereby would connect to the DC buss 234 of a DC power system and no inverter would be required. The invention would instantly and automatically supply power to prevent any interruptions.

Obviously, numerous modifications and variations of the described preferred embodiment are possible and will occur

What is claimed is:

1. A flywheel energy storage system for preventing power interruptions to a load from interruptions of primary power, comprising:
   a flywheel that is supported for rotation about an axis on a bearing system, and a motor-generator having a stator and a rotor coupled with said flywheel,
   said motor-generator has multiple stationary armature windings and a field coil;
   said field coil generates flux that passes through said armature windings as said rotor rotates;
   a rectifier connected to said primary power for delivering rectified primary power to a DC buss;
   an inverter connected to said DC buss for converting power from said DC buss to output power to said load;
   a synchronous inverter for delivering synchronized power to excite said armature windings during recharging of said flywheel;
   a field controller for maintaining power to said field coil during standby operation such that the current to said field coil remains substantially constant during a period including immediately before an interruption of primary power and immediately after an interruption of primary power.

2. A flywheel energy storage system as described in claim 1 wherein:
   said field controller includes a speed sensor for monitoring rotational speed of said flywheel and varying electrical power to said field coil to maintain a substantially constant back emf in said armature windings during an interruption of said primary power.

3. A flywheel energy storage system as described in claim 2 wherein:
   said field controller varies electrical current to said field coil approximately inverse linearly with said rotational speed of said flywheel.

4. A flywheel energy storage system as described in claim 1 wherein:
   said field coil has a weight Wfc in pounds, and said flywheel has a weight Wfw in pounds, wherein Wfc/Wfw>0.25.

5. A flywheel energy storage system as described in claim 1 wherein:
   said armature windings are located in a magnetic air gap formed between two surfaces of said rotor that rotate together.

6. A flywheel energy storage system as described in claim 5 wherein:
   said flux crosses only a single magnetic airgap in said motor/generator.

7. A flywheel energy storage system as described in claim 1 wherein:
   said field coil has a weight Wfc in pounds, and said flywheel energy storage system has a 15 second output power capability P in kilowatts, wherein Wfc/P>0.60.

8. A flywheel energy storage system as described in claim 1 wherein:
   said field coil has an inductance Ifc, and said armature windings has an individual phase inductance Iap, wherein Ifc/Iap>25,000.

9. A flywheel energy storage system for preventing power interruptions to a load from interruptions of primary power, comprising a flywheel that is supported for rotation about an axis on a bearing system, and a motor-generator having a rotor coupled with said flywheel, and a stator;
   said motor-generator has multiple stationary armature windings and a field coil;
   said field coil generates flux that passes through said armature windings as said rotor rotates;
   said armature windings are excited by a synchronous inverter connected to a DC buss that receives rectified primary power from a rectifier connected to said primary power;
   an inverter connected to said DC buss converts power from said DC buss to output power to said load;
   whereby, said field controller maintains power to said field coil when said primary power is not interrupted such that the back emf of said armature windings is equal to at least 75% of the voltage of said DC buss.

10. A flywheel energy storage system as described in claim 9 wherein:
    said field controller includes a speed sensor for monitoring rotational speed of said flywheel and varying electrical power to said field coil to maintain a substantially constant back emf in said armature windings during an interruption of primary power.

11. A flywheel energy storage system as described in claim 9 wherein:
    said field coil has a weight Wfc in pounds, and said flywheel energy storage system has a 15 second output power capability P in kilowatts, wherein Wfc/P>0.60.

12. A flywheel energy storage system as described in claim 9 wherein:
    said field coil has a weight Wfc in pounds, and said flywheel has a weight Wfw in pounds, wherein Wfc/Wfw>0.25.

13. A flywheel energy storage system as described in claim 9 wherein:
    said armature windings are located in a magnetic air gap formed between two surfaces of said rotor that rotate together.

14. A flywheel energy storage system as described in claim 9 wherein:
    said field coil has an inductance Ifc, and said armature windings has an individual phase inductance Iap, wherein Ifc/Iap>25,000.

15. A flywheel energy storage system for preventing power interruptions to a load from interruptions of primary power, comprising a flywheel that is supported for rotation about an axis on a bearing system, and a motor-generator having a rotor coupled with said flywheel, and a stator;
    said motor-generator has multiple stationary armature windings and a field coil;
    said field coil generates flux that passes through said armature windings as said rotor rotates;
    said armature windings are excited by a synchronous inverter connected to a DC buss that receives rectified primary power from a rectifier connected to said primary power;
    an inverter connected to said DC buss converts power from said DC buss to output power to said load;
    whereby, said field coil has an inductance Ifc, and said armature windings has an individual phase inductance Iap, wherein Ifc/Iap>25,000.

16. A flywheel energy storage system as described in claim 15 wherein:

said field coil has an inductance Ifc, and said armature windings has an individual phase inductance Iap, wherein Ifc/Iap>100,000.

17. A flywheel energy storage system as described in claim 15 wherein:

said field coil has a weight Wfc in pounds, and said flywheel has a weight Wfw in pounds, wherein Wfc/Wfw>0.25.

18. A flywheel energy storage system as described in claim 15 wherein:

said armature windings are located in a magnetic air gap formed between two surfaces of said rotor that rotate together.

19. A flywheel energy storage system as described in claim 15 wherein:

said field controller includes a speed sensor for monitoring rotational speed of said flywheel and varying electrical power to said field coil to maintain a substantially constant back emf in said armature windings during an interruption of primary power.

20. A flywheel energy storage system as described in claim 15 wherein:

said field coil has a weight Wfc in pounds, and said flywheel energy storage system has a 15 second output power capability P in kilowatts, wherein Wfc/P>0.60.

* * * * *